US005714717A

United States Patent [19]

Nakagome

[11] Patent Number: 5,714,717

[45] Date of Patent: Feb. 3, 1998

[54] METHOD AND APPARATUS FOR SPLICING ELECTRICAL WIRES

[75] Inventor: Masaharu Nakagome, Tokyo, Japan

[73] Assignee: Fuji Horn Co. Inc., Tokyo, Japan

[21] Appl. No.: 629,518

[22] Filed: Apr. 9, 1996

[30] Foreign Application Priority Data

Apr. 28, 1995 [JP] Japan .................................... 7-129045

[51] Int. Cl.$^6$ .................................................... H02G 15/113

[52] U.S. Cl. ................................................. 174/91; 174/92

[58] Field of Search .............................. 174/91, 92, 77 R, 174/138 F; 439/367, 465, 521, 687

[56] References Cited

U.S. PATENT DOCUMENTS

| | | | |
|---|---|---|---|
| 3,012,219 | 12/1961 | Levin et al. | 339/98 X |
| 3,715,459 | 2/1973 | Hoffman | 174/92 |
| 3,804,971 | 4/1974 | Bazille, Jr. | 174/88 R X |
| 3,992,569 | 11/1976 | Hankins et al. | 174/92 |
| 5,198,619 | 3/1993 | Baker | 174/74 A X |
| 5,371,323 | 12/1994 | Schneider et al. | 174/92 |
| 5,397,859 | 3/1995 | Robertson et al. | 174/92 |
| 5,426,715 | 6/1995 | Moisson et al. | 385/76 X |
| 5,498,172 | 3/1996 | Noda | 439/404 X |

*Primary Examiner*—Kristine L. Kincaid
*Assistant Examiner*—Chau N. Nguyen
*Attorney, Agent, or Firm*—Michael D. Bednarek; Kilpatrick Stockton LLP

[57] ABSTRACT

A splice for two or more electrical wires can be made waterproof by introducing a jelly material into a splice body and splice cover made from an electrically insulating material. The jelly prevents the infiltration of water or moisture into the holes of the closed splice body into which the spliced wires are led. The splice body and cover are formed with a plurality of grooves that correspond to each other such that when the splice cover is closed over the splice body, the grooves form the holes into which the electrical wires are led. The splice cover may be in more than one piece. A conducting material is disposed across the interior of the splice for penetrating the covers on coated electrical wires to effect the splice by creating an electrical contact between the main and branch wires. When the splice cover is closed the waterproof jelly spreads over the outer surfaces of the wires.

20 Claims, 6 Drawing Sheets

METHOD AND APPARATUS FOR SPLICING ELECTRICAL WIRES

FIELD OF THE INVENTION

The present invention relates to a splice for electrical wires that mutually connects a plurality of electrical wires. More particularly, the invention concerns a splice casing for splicing at least one branch wire into a main wire and waterproofing the wires at the electrical connection.

BACKGROUND OF THE INVENTION

The main line to which a branch line must be spliced may be a coated electrical wire. It is frequently necessary to tap the main line at an intermediate point and splice it with the branch line that is also a coated electrical wire. An electrical wire splice casing has a splice body formed of an electrically insulating material and provided with two grooves. The two grooves accept respectively the main and branch coated electrical wires.

Attached to the splice body is a splice cover, also made of an electrically insulating material. The splice cover is provided with two grooves corresponding to the two grooves in the splice body. The splice cover may be closed over the splice body such that the main and branch wires are held between the corresponding grooves in the splice body and cover.

A conducting material is disposed in the splice body, transverse to the two grooves, which crosses the two grooves near the center of their length. This conducting material contains slits the sides of which grip and contact the inner conducting cores of the coated electrical wires. This conducting material is the electrical medium through which the conducting cores of the main and branch wires are electrically connected to effect the desired splice.

A problem arises when the splice body and cover described above must be used in a moist environment. Prior art splices provide no means for waterproofing the electrical connection from the environment. Thus, even with a splice cover closed over the splice body, the electrical connection created by the splice may be infiltrated with water or moisture.

Accordingly, when splicing coated electrical wires, there is a need for a splice casing that provides a reliable electrical connection between the spliced wires and resists the damaging and dangerous intrusion of moisture at the site of the splice.

SUMMARY OF THE INVENTION

It is, therefore, an object of the present invention to provide a splice casing (a splice body and cover) that creates a splice between electrical wires in a manner that is simple, reliable and waterproof.

Additional objects, advantages and novel features of the invention will be set forth in part in the description that follows, and in part will become more apparent to those skilled in the art upon examination of the following or may be learned by practice of the invention. The objects and advantages of the invention may be realized and attained by means of the instrumentalities and combinations particularly pointed out in the appended claims To achieve the stated and other objects of the present invention, as embodied and described below, the invention may comprise:

- a splice body formed of an electrically insulating material and having grooves formed therein to hold the electrical wires to be spliced;
- a splice cover formed of an electrically insulating material and having grooves formed therein to hold the electrical wires to be spliced which correspond to the grooves formed in the splice body when the splice cover is closed over the splice body;
- a conducting material disposed to effect an electrical connection between the electrical wires to be spliced;
- an amorphous material disposed such that, when the splice cover is closed over the splice body, the amorphous material prevents the infiltration of water or moisture to the connections between the conducting material and the electrical wires; and
- a membrane of material formed over the grooves of the splice body and splice cover.

BRIEF DESCRIPTION OF THE DRAWINGS

The accompanying drawings, which are incorporated in and form a part of the specification, illustrate the present invention and, together with the description, serve to explain the principles of the invention. In the drawings.

DETAILED DESCRIPTION OF PREFERRED EMBODIMENT

Using the drawings, the preferred embodiments of the present invention will now be explained.

Figure 1:
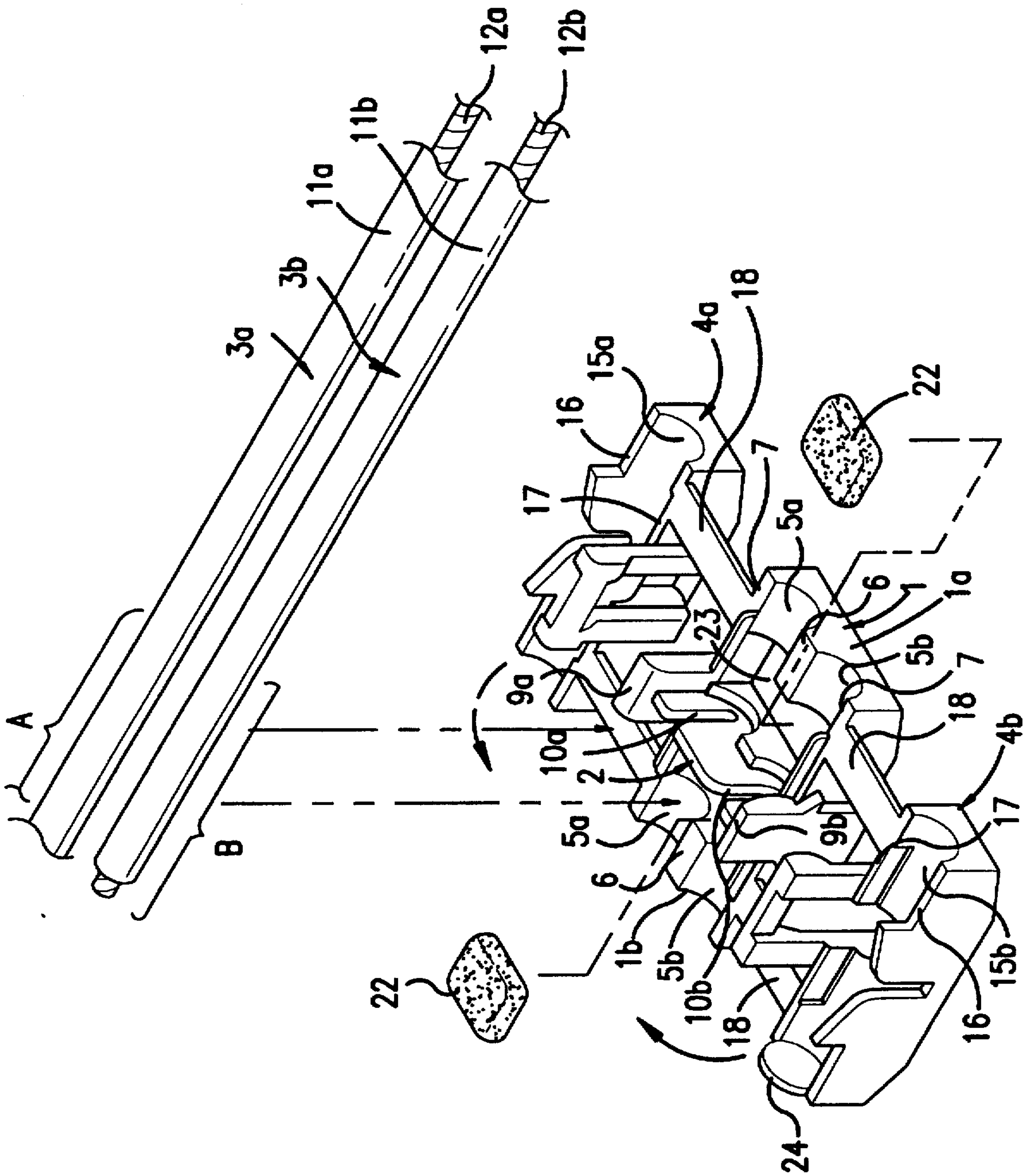
FIG. 1 is a 3-dimensional exploded drawing of an embodiment of the present invention of an electrical wire splice and splice casing.

As shown in FIG. 1, an embodiment of the present invention includes a splice body 1 and a conducting material 2 that may be disposed in the splice body 1. Coated electrical wires **3*a* and 3*b* are clamped by the splice body 1, conducting material 2, and splice cover portions 4*a* and 4*b* when the cover portions are closed over the splice body 1. The splice cover portions 4*a* and 4*b*** are designed to mate with the splice body 1.

The splice body 1, for example, is made from an electrically insulating material such as plastic. In a flat surface, it contains two grooves **5*a* and 5*b* to accept coated electrical wires 3*a* and 3*b* respectively. These grooves 5*a* and 5*b* have a semicircular cross-section that corresponds to the outer contour of the coated electrical wires 3*a* and 3*b*. The electrical conducting material 2 divides the splice body 1 into two sides 1*a* and 1*b*. The grooves 5*a* and 5*b* each extend substantially parallel to each other from side 1*a* to side 1*b* of the splice body 1. The grooves 5*a* and 5*b*** are traversed by the electrical conducting material 2.

One groove **5*a* receives portion A of the main line 3*a*. Portion A need not be the end of the main line 3*a*, but may be an intermediate point at which a splice is required. The other groove 5b receives portion B of the branch line 3b. Portion B is the end of the line 3b in the present example. The surface 6 of the splice body 1 between the two grooves and the surface 7** to either side of the two grooves exists in a single plane.

In the present example of a splice casing, the conducting material 2 is disposed across the grooves 5a and 5b. The conducting material 2 crosses the grooves substantially in the middle of the longitudinal axis of the grooves. This conducting material 2 approximates a rectangular plate and is disposed perpendicularly to the two grooves 5a and 5b.

Figure 2:
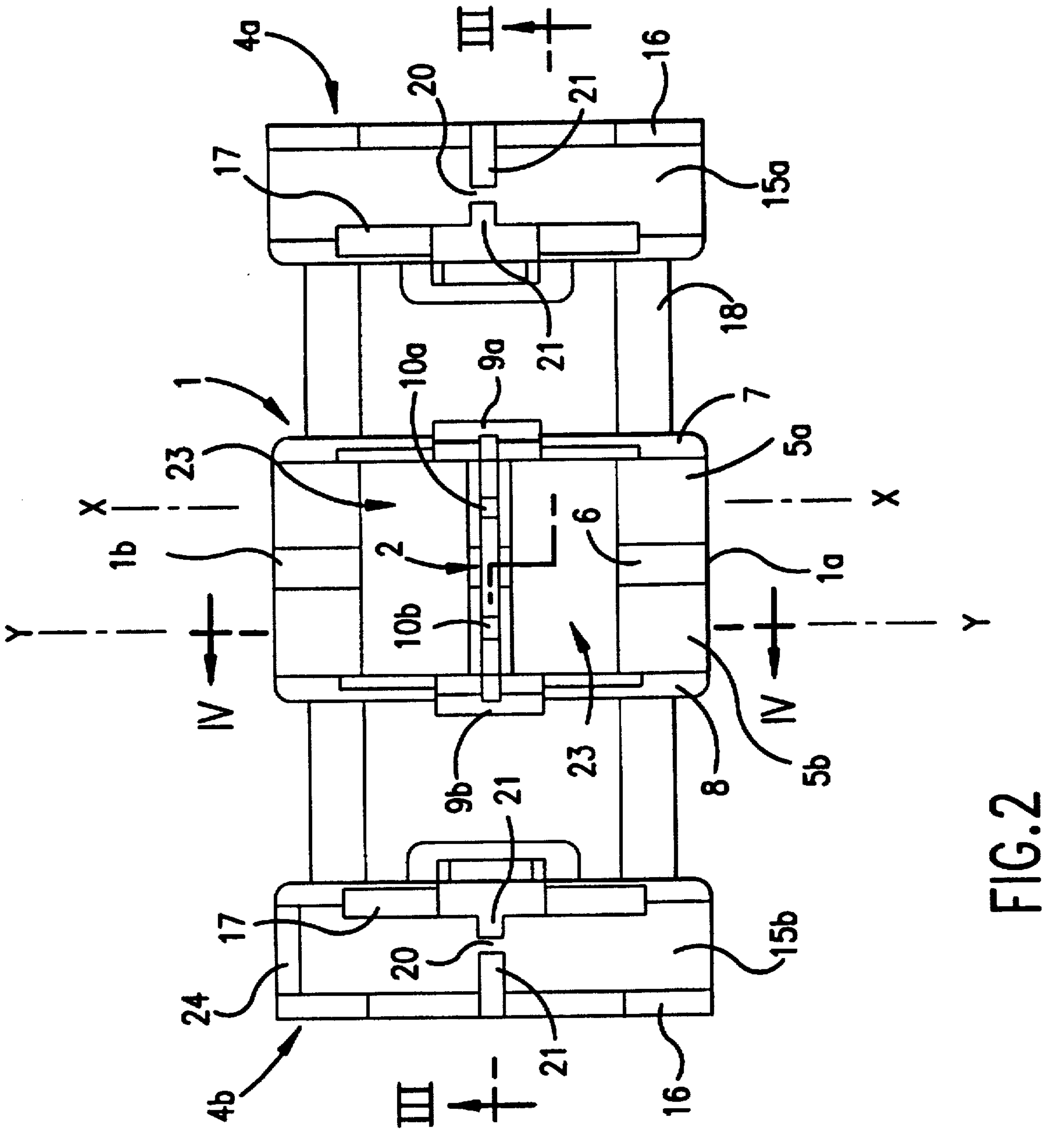
FIG. 2 is a plan view of the splice and splice casing pictured in FIG. 1 with the splice covers in the open position.

In FIG. 2, lines X—X and Y—Y are the longitudinal axes of the wires 3a and 3b (i.e. axes extend along the length of the coated electrical wires 3a and 3b respectively). For example, the lower part of the conducting material 2 may be fixed in the splice body 1 and supported by retainers 9a and 9b that are formed on either side of the two grooves 5a and 5b.

In FIG. 1, the conducting material 2 contains two slits 10a and 10b that correspond to the two grooves 5a and 5b respectively. The sides of these slits 10a and 10b cut through the insulation 11a and 11b that coats the electrical wires 3a and 3b when the wires are received in the grooves 5a and 5b and when the splice cover portions 4a and 4b are firmly pressed together with the splice body 1. The sides of slits 10a and 10b of the conducting material 2 are thus in electrical contact with conducting cores 12a and 12b of the wires 3a and 3b, respectively. The conducting cores 12a and 12b are thus positioned through the slits 10a and 10b respectively without being severed.

Figure 3:
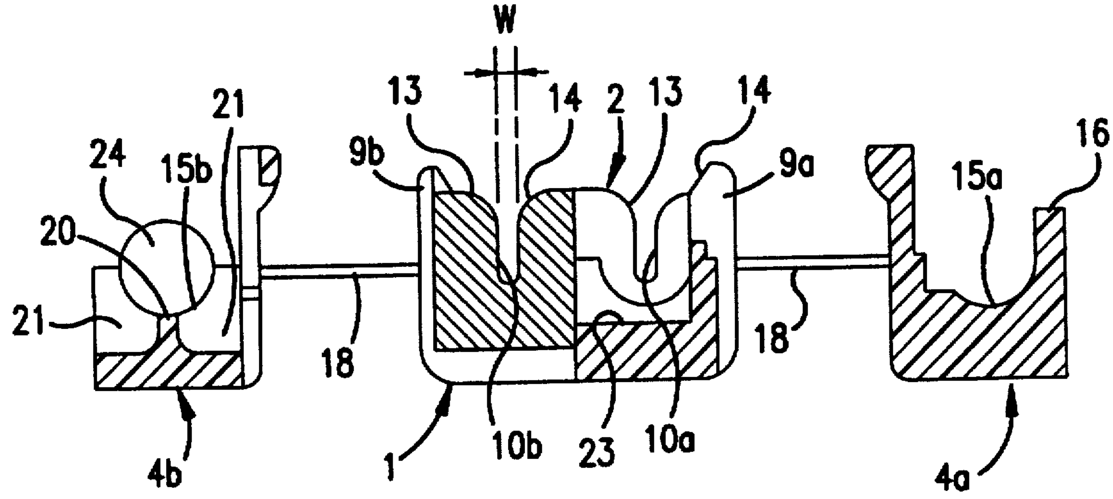
FIG. 3 is a cross sectional view through line III—III of FIG. 2.
Figure 4:
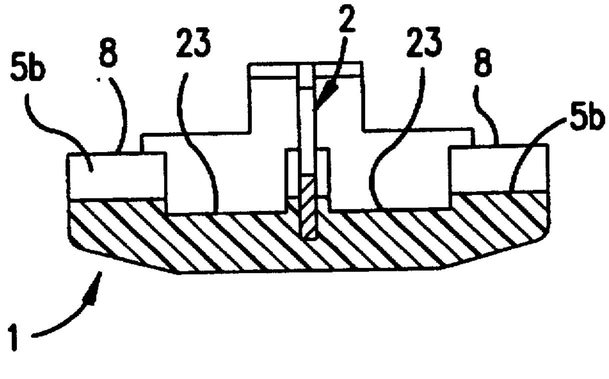
FIG. 4 is a cross sectional view through line IV—IV of FIG. 2.

For this reason, as illustrated in FIG. 3, the mouths of slits 10a, 10b are open at the top with left 13 and right 14 sections to accept the coated electrical wires 3a and 3b and to smoothly perform the cut through the insulation material 11a and 11b. The slit width W is made slightly smaller than the conducting cores 12a and 12b. Thus, the sides of slits 10a and 10b of the conducting material 2 are in electrical connection with the conducting cores 12a and 12b of both the main line 3a and the branch line 3b. In this way, any signal carried by the main line 3a is communicated through the conducting material 2 into the branch line 3b, thereby effecting the desired splice between the main line and the branch line.

In the present example, a splice cover is comprised of the two cover portions 4a and 4b. It will be understood, that the splice cover of the present invention may be formed in one or more portions as will be described in a later embodiment. The splice cover portions 4a and 4b may be made of a plastic, electrically insulating material similar or identical to the material used to make the splice body 1. The cover portions 4a and 4b are a matching, identical pair designed to mate with the splice body 1.

Like the splice body 1, the cover portions 4a and 4b have grooves 15a and 15b that have a semicircular cross-section. The grooves 15a and 15b are formed so as to correspond to the grooves 5a and 5b of the splice body 1, forming cylindrical openings in the splice casing when the splice cover portions 4a and 4b are closed over the splice body 1.

Again in FIG. 1, the flat surfaces 16 of the splice cover portions 4a and 4b oppose the flat surface 6 of the splice body 1 when the splice cover is closed. Likewise, the flat surfaces 17 of the splice cover portions 4a and 4b oppose the flat surfaces 7 of the splice body 1 when the splice cover is closed. The surfaces 17 and 16 on each splice cover portion 4a and 4b exist in a single plane.

Figure 5:
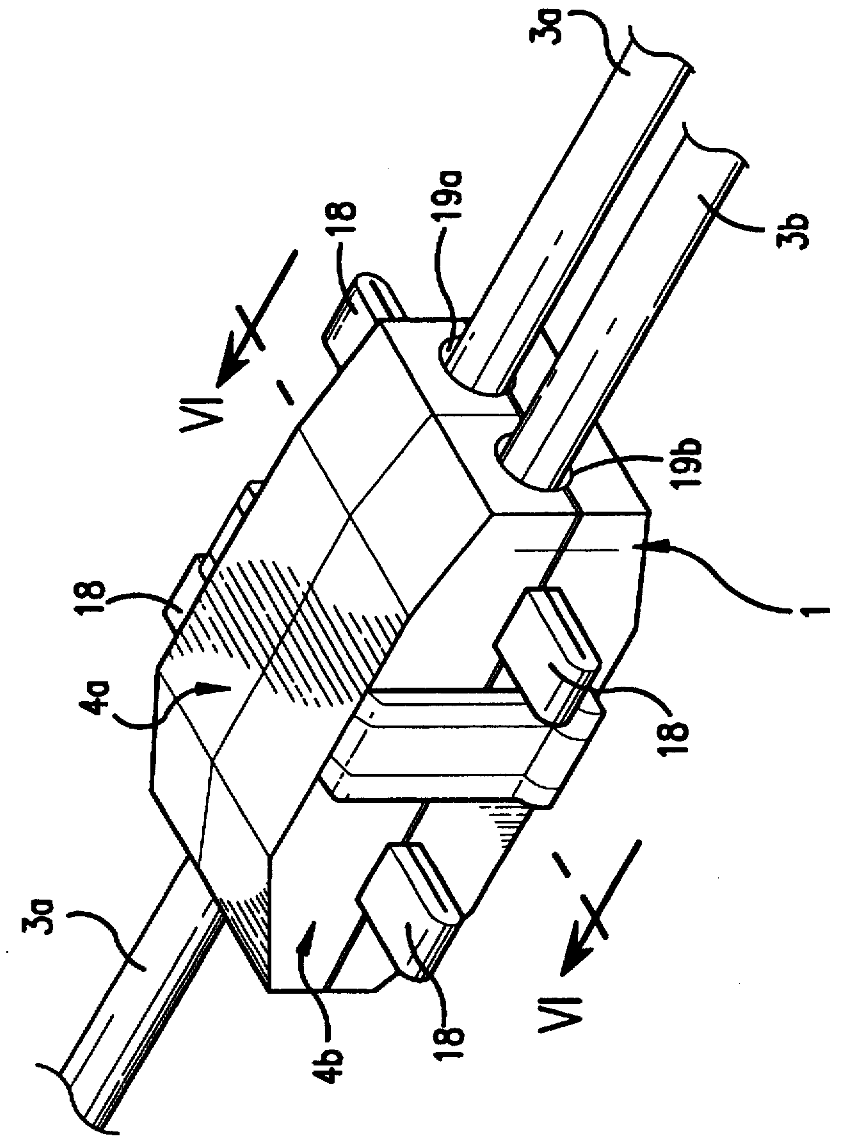
FIG. 5 is a 3-dimensional drawing of the splice and splice casing of FIG. 1 showing the coated electrical wires spliced and the casing closed.
Figure 6:
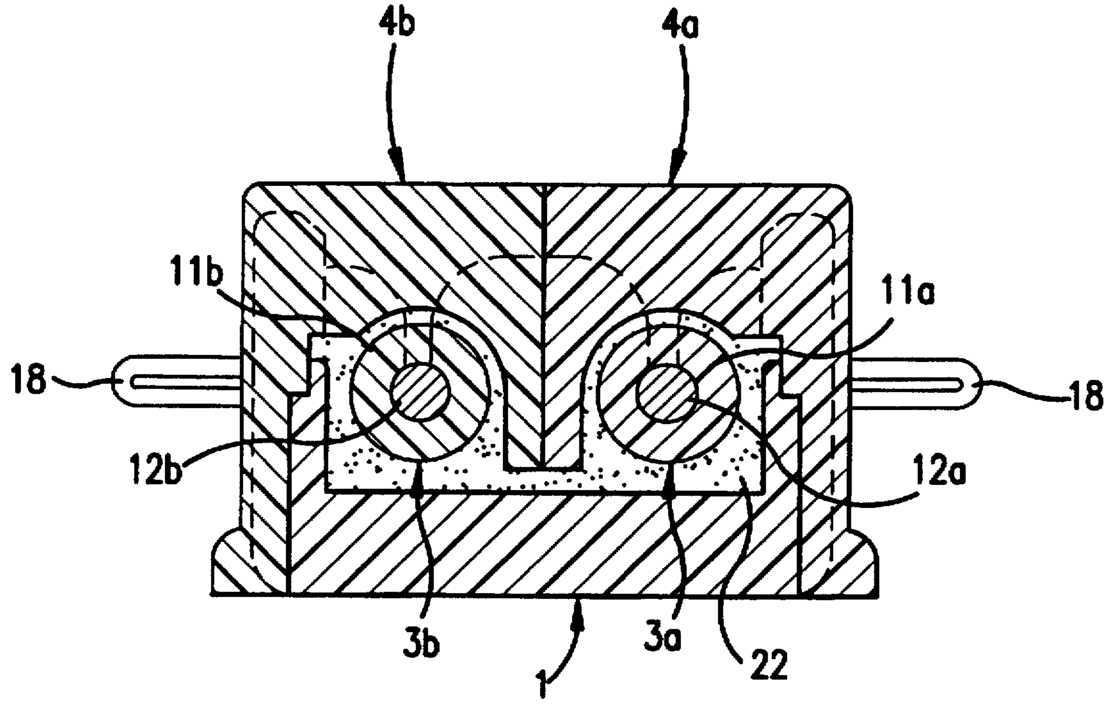
FIG. 6 is a cross sectional view through line VI—VI of FIG. 5.

The splice cover portions 4a and 4b are attached to either side of the splice body 1 by flexible straps 18. As shown in FIG. 5, the flexible straps 18 allow the splice cover portions 4a and 4b to be closed and mated over the splice body 1. When the grooves 5a and 5b are thus opposed with grooves 15a and 15b, two parallel wire holes 19a and 19b are formed to accommodate the electrical wires 3a and 3b.

At places other than at the electrical wire holes 19a and 19b, the flat surfaces 6 and 7 of the splice body 1 are in intimate contact with the flat surfaces 16 and 17 of the splice cover portions 4a and 4b, respectively. For this reason, there will typically be a water or moisture seepage problem only through the electrical wire holes 19a and 19b.

In the present example, the end of the branch line 3b is located in the splice casing. However, it will be understood by those skilled in the art that the principles of the present invention may also be applied to a splice between two lines, neither of which terminate at the splice. In FIG. 1, a circular cap 24 is provided to close a hole that would otherwise be formed by the grooves 5b and 15b. This cap 24 is formed as a single piece at the end of the groove 15b on the splice cover portion 4b. When the splice cover portion 4b is closed over the splice body 1, the cap 24 creates a strong seal, capping off an unused wire hole 19b and preventing the infiltration of water.

As best seen in FIG. 3, each splice cover portion 4a and 4b has a protrusion 20 formed so that when the splice cover portions 4a and 4b are closed over the splice body 1 holding coated electrical wires 3a and 3b, the coated electrical wires are pressed into the slits 10a and 10b of the conducting material 2. This protrusion 20 is shaped to fit tightly into the upper part of the slits 10a and 10b of the conducting material 2, thereby forcing wires 3a and 3b into the slits 10a and 10b.

When a suitable tool, for example a pair of pliers, is used to press the cover portions 4a and 4b and the splice body 1 firmly together, the electrical wire presser protrusions 20 fit into the respective slits 10a and 10b. Also, the upper left and right sides 13 and 14 of the respective slits 10a and 10b are inserted into the compartments 21 of the cover portions 4a and 4b on either side of the protrusion 20.

When the cover portions 4a and 4b and the splice body 1 are firmly pressed together, the coated electrical wires 3a and 3b are held between the respective cover portions 4a and 4b and the splice body 1 by the corresponding grooves (5a–15a and 5b–15b). The wire coating 11a and 11b is penetrated by the upper sides 13 and 14 of the slits 10a and 10b such that the inner conducting cores 12a and 12b are brought into electrical contact with the sides of slits 10a and 10b of the conducting material 2. By this means, a splice between the main line 3a and the branch line 3b is effected. The inner conducting core 12a of the main line 3a is in electrical contact with the inner conducting core 12b of the branch line 3b through the medium of conducting material 2.

According to the principles of the present invention, an amorphous waterproof jelly 22 is used to prevent water or moisture seepage through the holes 19a and 19b (FIG. 5) formed by the closure of the splice cover portions 4a and 4b over the splice body 1. The jelly 22 may be placed in the grooves 5a and 5b, in grooves 15a and 15b, or in all the grooves before the splice cover portions 4a and 4b are closed. The jelly material 22 may, for example, be a petrolatum type or polybutane material.

In the alternative, jelly material compartments 23 are formed between the conducting material 2 and the outer edges of the grooves 5a and 5b. In this embodiment, the jelly 22 may be placed in the jelly material compartments 23 before the splice cover portions 4a and 4b are closed over the splice body 1. Using jelly compartments 23 to contain the jelly 22 has the advantage that the jelly 22 will be prevented from shifting position.

Moreover, the jelly compartments and jelly 22 can be provided not only in the splice body 1 but also in the cover portions 4a and 4b. The decision whether to apply the jelly 22 to the splice body 1 and the splice cover portions 4a and 4b, rather than to just the splice body 1, is decided by the degree of waterproofing that is optimal in a given application. Jelly compartments formed in the cover portions 4a and 4b gain the same advantage of preventing any displacement of the jelly 22.

In any event, when the splice covers 4a and 4b are closed over splice body 1, the main line 3a and the branch line 3b will be clamped between grooves 5a–15a and 5b–15b, respectively. The jelly 22 will spread over the exterior surfaces of the wires 3a and 3b and the surface of the grooves 5a, 5b, 15a and 15b to form a waterproof seal preventing the infiltration of water or moisture from outside the splice to the electrical connection between main line 3a, branch line 3b and conducting material 2.

Figure 7:
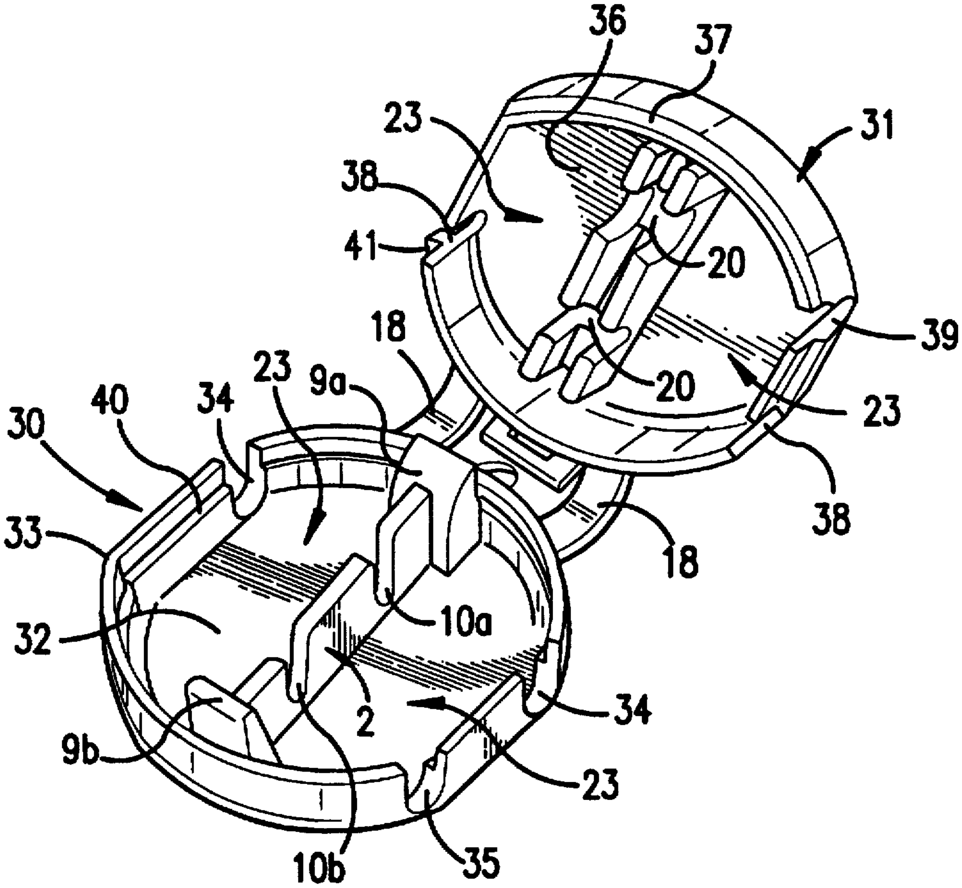
FIG. 7 is a 3-dimensional drawing of another preferred embodiment of an electrical wire splice and splice casing.
Figure 8:
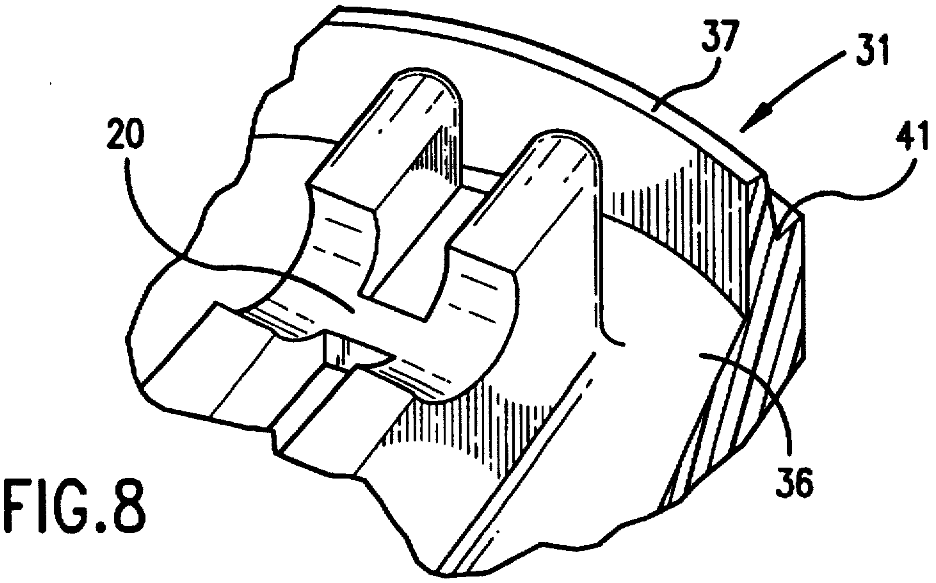
FIG. 8 is an enlarged 3-dimensional view of a portion of FIG. 7.

Referring to FIGS. 7 and 8, an additional embodiment of the present invention is illustrated. This embodiment employs a different splice body 30 and a single splice cover 31. In the splice body 30, a bottom 32 and an annular wall 33, which is erected around the bottom 32, are formed of an electrically insulating material, such as plastic. The annular wall 33 is formed with two grooves 34 that mutually oppose each other to accept the main line coated electrical wire 3a. The annular wall 33 also has a single groove 35 to accept a branch coated electrical wire 3b.

Across the interior of the splice body 30, a conducting material 2 is disposed. In this example, the conducting material 2 is fixed at both ends by supports 9a and 9b that are formed as an integral part of the splice body 30. The conducting material 2 has the same slits 10a and 10b as the above-described embodiment.

The cover portion 31 differs from the earlier embodiment because it is formed as a single piece and not as two portions. This cover portion 31 has a bottom 36 and an annular wall 37 erected at its circumference like the splice body 30. The cover portion 31 has a contour designed to correspond to the splice body 30. The cover portion 31 is attached to the splice body 30 by a pair of flexible straps 18.

In the cover 31, the annular wall 37 has two grooves 38 mutually opposed and corresponding to the grooves 34 in the annular wall 33 of the splice body 30 when the cover 31 is closed. The grooves 38 are formed to accept the main line coated electrical wire 3a. A single groove 39, corresponding to the groove 35, is also formed in the cover 31 to accept the branch coated electrical wire 3b.

Referring to FIG. 8, the cover 31 is provided with a protrusion 20 that is sized to fit into the tops of grooves 10a and 10b in the conducting material 2 of the splice body 30. This protrusion 20 performs identically to the protrusion described in the previous embodiment.

The annular wall 33 of the splice body 30 and the annular wall 37 of the cover 31 are designed with stepped lips 40, on body 30, and 41, on cover 31. The lips 40 and 41 are designed to fit together intimately. For this reason, when the cover 31 is closed over the splice body 30, the internal and external parts of the body 30 and the cover 31 are also in intimate contact except for the grooves 34, 35, 38 and 39.

In this embodiment, the conducting material 2 divides the splice body 30 into two halves and, together with the annular wall 33, naturally forms two jelly material compartments 23. Just as described above, the jelly 22 is placed in the splice body 30, the splice cover 31, or both before the cover 31 is closed over the splice body 30, thereby providing a waterproof seal that protects the interior electrical connection between the spliced wires 3a and 3b from water or moisture.

Because this embodiment calls for a single splice cover portion 31, it is simpler that the previously described embodiment. For this reason, this embodiment of the invention will be easier to manufacture.

In any embodiment, a further improvement may be made as follows. When the splice body 1 or 30 and cover portion (s) 4a, 4b or 31 are formed, a thin membrane of the insulating material used may be left or intentionally formed over the grooves 35, 34, 38, 39, 5a, 5b, 15a and 15b. By tearing through or stretching this membrane to allow the passage of electrical wires 3a or 3b, the ability of the splice to prevent the intrusion of water is improved with or without the additional use of the jelly material 22.

The above description has been presented only to illustrate and describe the invention. It is not intended to be exhaustive or to limit the invention to any precise form disclosed. Many modifications and variations are possible in light of the above teaching.

The preferred embodiment was chosen and described to best explain the principles of the invention and its practical application to enable others skilled in the art to best utilize the invention in various embodiments and with various modifications as are suited to the particular use contemplated. It is intended that the scope of the invention be defined by the following claims.

What is claimed is:

1. A splice casing for electrical wires comprising:

a splice body formed of an electrically insulating material and having at least three grooves formed therein to hold the electrical wires to be spliced, at least two of the grooves extending along a common axis so as to support one of the electrical wires that extends through the splice body;

a splice cover formed of an electrically insulating material and having at least three grooves formed therein to hold the electrical wires to be spliced which correspond to the grooves formed in said splice body when the splice cover is closed over said splice body;

a conducting material located within the housing for providing a sole electrical connection between the electrical wires to be spliced; and an amorphous material disposed such that, when said splice cover is closed over said splice body, the amorphous material prevents the infiltration of water or moisture to the connection between the conducting material and the electrical wires.

2. A splice casing as claimed in claim 1, wherein said conducting material has slits into which the electrical wires to be spliced are placed.

3. A splice casing as claimed in claim 2, wherein the splice cover is provided with protrusions corresponding to said slits and sized to fit into the tops of said slits to force the electrical wires to be spliced into said slits when said splice cover is closed over said splice body.

4. A splice casing as claimed in claim 1, wherein said splice cover is formed in two portions each of which may be closed over a portion of said splice body.

5. A splice casing as claimed in claim 1, further comprising at least one compartment formed in the splice body or the splice cover for holding said amorphous material.

6. A splice casing as claimed in claim 1, wherein said amorphous material is placed in the grooves of said splice body.

7. A splice casing as claimed in claim 1, wherein said amorphous material is placed in the grooves of said splice cover.

8. A splice casing as claimed in claim 1, wherein said amorphous material is a petrolatum type material or polybutane.

9. A splice casing as claimed in claim 1, wherein a membrane material is formed across said grooves.

10. A splice casing as claimed in claim 1, further comprising a cap for sealing an opening made by said corresponding grooves through which an electrical wire is not placed.

11. A splice casing for electrical wires comprising:

a splice body formed of an electrically insulating material and having at least three grooves formed therein to hold the electrical wires to be spliced, at least two of the grooves extending along a common axis so as to support one of the electrical wires that extends through the splice body;

a splice cover formed of an electrically insulating material and having at least grooves formed therein to hold the electrical wires to be spliced which correspond to the grooves formed in said splice body when the splice cover is closed over said splice body;

a conducting material disposed in the casing to provide a sole electrical connection between the electrical wires to be spliced; and a membrane material formed across said grooves.

12. A method of splicing electrical wires of the type containing a conductive core and an insulating outer sheath, the method comprising the steps of:

forming a splice body of an electrically insulating material and forming grooves therein to hold the electrical wires to be spliced;

forming a splice cover of an electrically insulating material and forming grooves therein to hold the electrical wires to be spliced which correspond to the grooves formed in said splice body when the splice cover is closed over said splice body;

providing a conducting material and arranging the conducting material within the splice body such that when the splice cover is closed over the splice body the conducting material is brought into electrical contact with the conductive core of the electrical wires so as to effect a sole electrical connection between the electrical wires to be spliced; and providing an amorphous material such that, when said splice cover is closed over said splice body, the amorphous material prevents the infiltration of water or moisture to the connection between the conducting material and the electrical wires.

13. A method of splicing as claimed in claim 12, wherein said conducting material is a plate having slits into which the electrical wires to be spliced are placed.

14. A method of splicing as claimed in claim 13, further comprising the step of providing protrusions that correspond to said slits and are sized to fit into the tops of said slits to force the electrical wires to be spliced into said slits when said splice cover is closed over said splice body.

15. A method of splicing as claimed in claim 12, wherein said splice cover is formed in two portions each of which may be closed over a portion of said splice body.

16. A method of splicing as claimed in claim 12, further comprising the step of forming at least one compartment in the splice body or the splice cover for holding the amorphous material.

17. A method of splicing as claimed in claim 12, further comprising the step of placing said amorphous material in the grooves of said splice body.

18. A method of splicing as claimed in claim 12, further comprising the step of placing said amorphous material in the grooves of said splice cover.

19. A method of splicing as claimed in claim 12, wherein said amorphous material is a petrolatum type material or polybutane.

20. A method of splicing as claimed in claim 12, further comprising the step of forming a membrane material across said grooves.

* * * * *